April 16, 1968

J. W. PICKRELL 3,377,788

HAY RAKE

Filed Sept. 25, 1964

INVENTOR.
JOHN W. PICKRELL
BY
*McLaughlin & Cahill*
ATTORNEYS

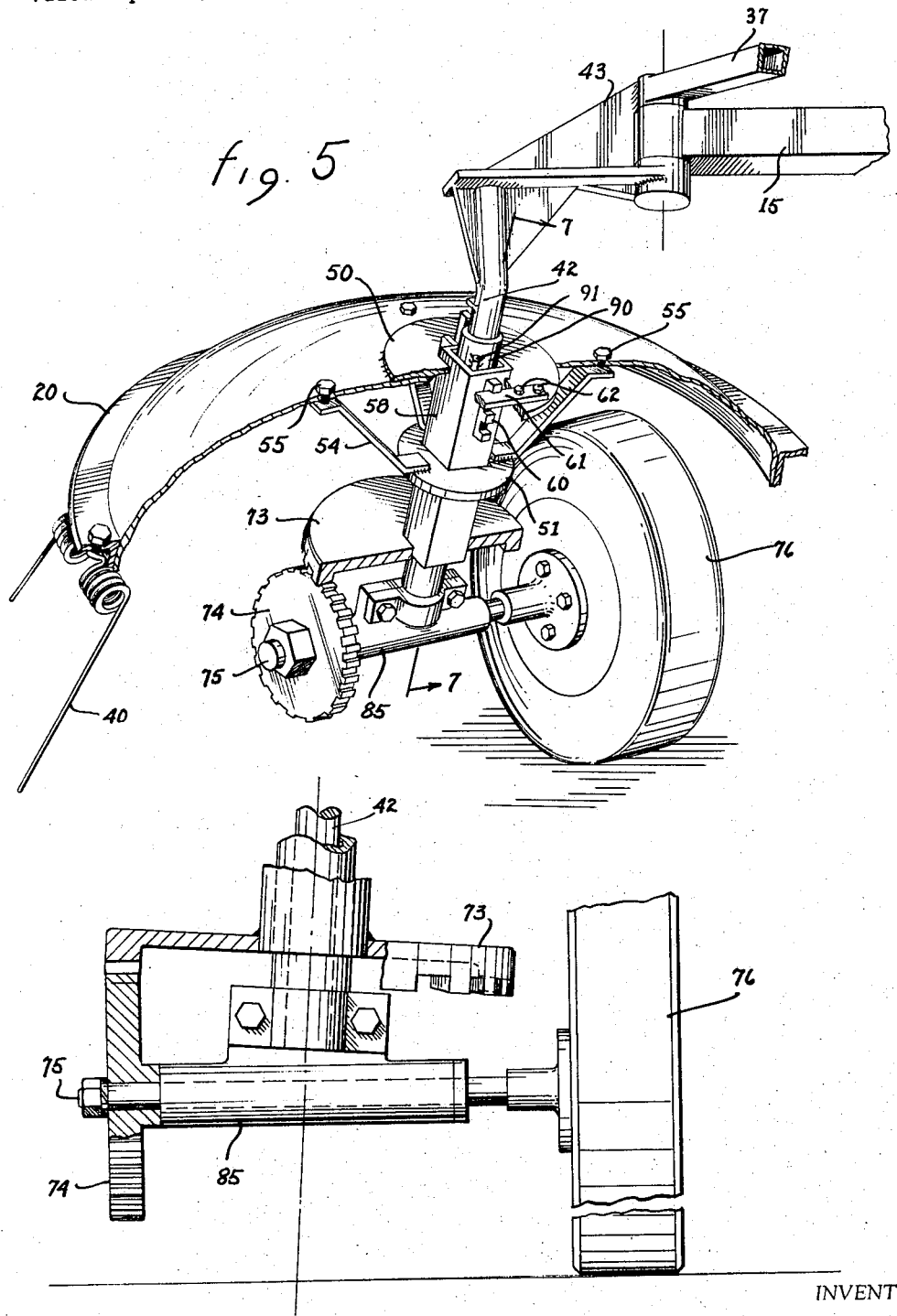

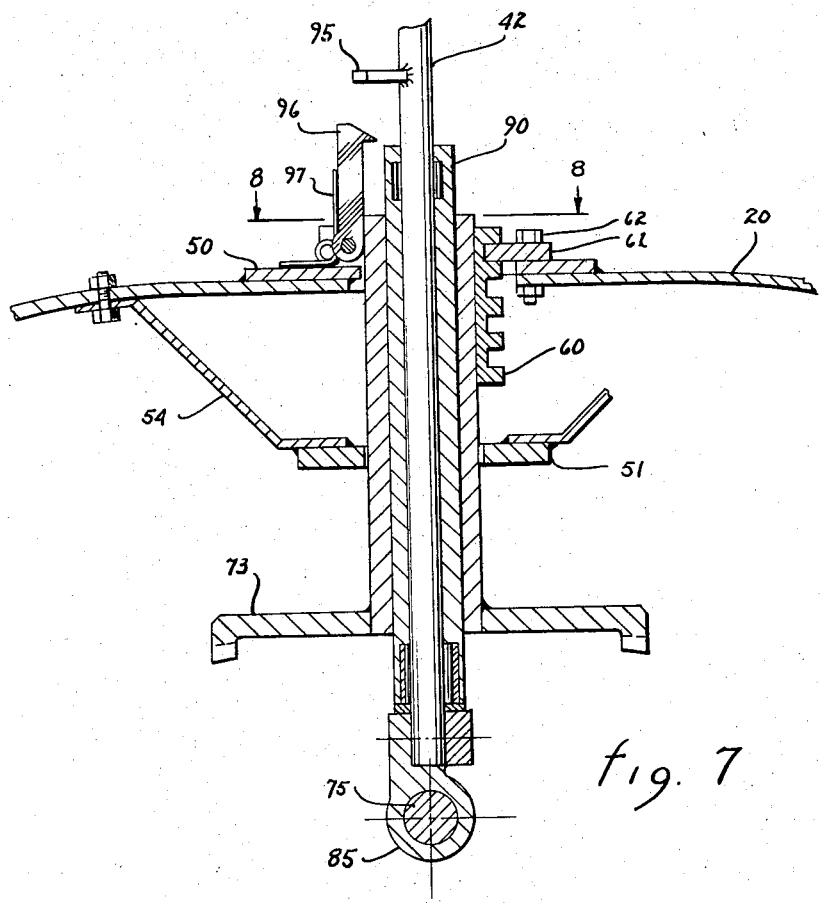
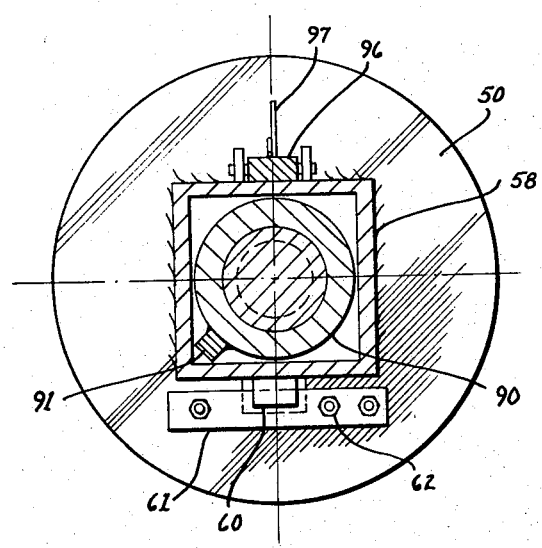

United States Patent Office 3,377,788
Patented Apr. 16, 1968

3,377,788
HAY RAKE
John W. Pickrell, 6237 E. Monterey Way,
Scottsdale, Ariz. 85251
Filed Sept. 25, 1964, Ser. No. 399,177
11 Claims. (Cl. 56—377)

ABSTRACT OF THE DISCLOSURE

A wheel rake utilizing a plurality of raking wheels mounted on inclined axes to permit tines extending from the periphery thereof to contact the ground immediately in front of each wheel as the wheel passes over the ground. Each raking wheel is individually driven through a mechanical coupling connected to a ground-contacting drive wheel positioned immediately below the raking wheel.

The present invention pertains to hay rakes, and more particularly, to hay rakes of the type known as wheel rakes wherein a plurality of wheels, having tines extending radially therefrom, are utilized to rake hay into windrows.

The present invention represents an improvement over the inclined wheel hay rake described and claimed in copending patent application Ser. No. 372,635, and now Patent 3,349,551, filed June 4, 1964. The present invention, in addition to providing increased efficiency, light weight, and ruggedness, further provides additional economy and adaptability to variety of hay raking conditions. When hay rakes are being drawn over rough terrain, it is desirable to provide a means for preventing the tines of the raking wheels from gouging or digging into the earth. It is also desirable to be able to transport the hay rake, for short distances, on highways or rural roads without having to mount the rake on a trailer or other transport vehicle.

It is therefore an object of the present invention to provide a hay rake of the inclined raking type that may conveniently be transported over hard surface roads without damage to the road or the rake.

It is also an object of the present invention to provide a hay rake of the inclined raking wheel type having a drive means for driving the inclined raking wheels and which also acts as a raking wheel elevating means to guide the raking wheel over rough terrain.

It is still another object of the present invention to provide a hay rake of the inclined raking wheel type that may conveniently be maneuvered.

These and other objects and advantages of the present invention will become apparent to those skilled in the art as the description thereof proceeds. To facilitate the description of the present invention, reference may be had to the accompanying drawings in which:

FIGURE 5 is an enlarged isometric view, partly in section, of a portion of the device shown in FIGURE 1.

FIGURE 6 is an elevational view of a portion of the drive arrangement illustrated in FIGURE 5.

FIGURE 7 is a sectional view of a portion of FIGURE 5 taken along line 7—7.

FIGURE 8 is a sectional view of a portion of FIGURE 7 taken along line 8—8.

Figure 3:
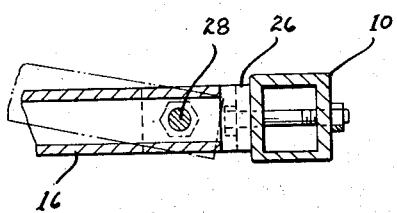
FIGURE 3 is an enlarged sectional view of a portion of FIGURE 1 taken along line 3—3.
Figure 1:
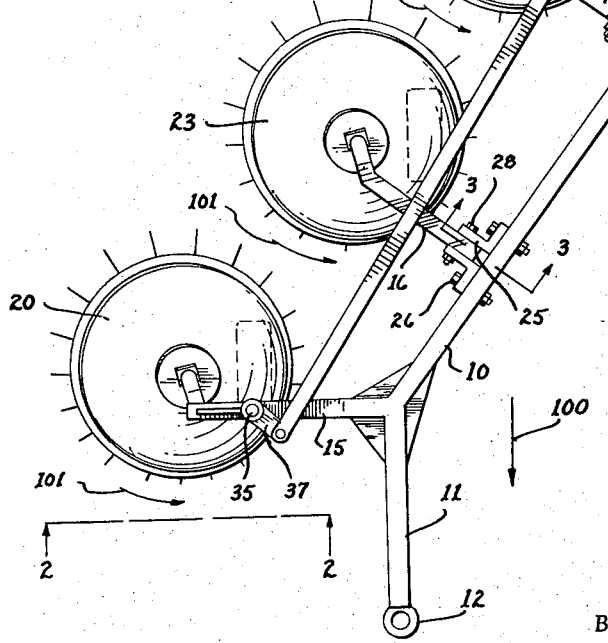
FIGURE 1 is a top view of a hay rake constructed in accordance with the teachings of the present invention.

Referring to FIGURE 1, a frame 10 is provided having an arm 11 including a convenient means, such as ring 12, for connecting the frame to a tractive vehicle. Arms 15, 16, 17, and 18 each extend from the frame 10 and support a raking wheel and drive arrangement. The embodiment shown in FIGURE 1 includes a leading raking wheel 20, a trailing raking wheel 21, and two intermediate raking wheels 22 and 23. The intermediate raking wheels are supported by their respective arms 16 and 17 which are pivotally attached to the frame 10 in any convenient manner such as by flanges 25 and 26 bolted to the frame 10 and provided with a through-bolt 28 passing through the arm 16. The pivotal arrangement of the arm 16 may better be seen by reference to FIGURE 3 wherein the arm 16 is shown attached to the frame 10 by the flange 26 which, in turn, is secured to the frame 10 by welding or bolting. The arm 16 is pivotal about an axis defined by the through-bolt 28 which defines a horizontal pivotal axis. The arm 16 is thus free to raise or lower such as indicated in FIGURE 3 by the dash line.

Figure 2:
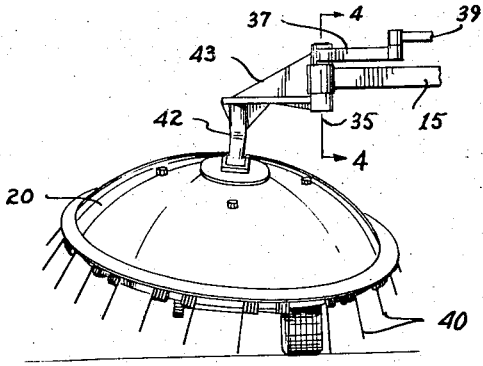
FIGURE 2 is a side elevational view of a portion of FIGURE 1 looking along line 2—2.
Figure 4:
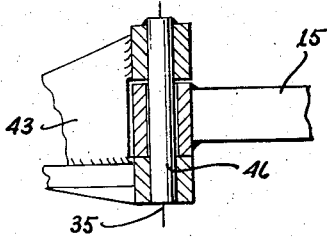
FIGURE 4 is an enlarged view, partly in section, of the vertical pivotal axis shown in FIGURE 2.

The leading raking wheel 20 and trailing raking wheel 21 are each secured to their respective arms, and thus to the frame 10, through a coupling including a vertical axis. The axes 35 and 36 are perpendicular to the plane of the drawing shown in FIGURE 1. Steering arms 37 and 38 are connected at the vertical axes 35 and 36 respectively, in a manner to be described more fully hereinafter. A connecting rod 39 joins the two steering arms so that when one steering arm pivots clockwise about one vertical axis, the other steering pivots counterclockwise about the other vertical axis. Referring to FIGURE 2, the leading raking wheel 20 is shown, and includes a plurality of tines 40 for raking hay. The inclined raking wheel 20 is rotatably supported on a shaft 42, as will be explained more fully hereinafter, which, in turn, is supported on an arm 43 pivotally secured to the end of the arm 15. The pivot permits rotation of the entire inclined raking wheel assembly about a vertical axis 35. Steering arm 37 is secured to arm 43 and thereby rotates about the vertical axis 35 concurrently with the arm 43. The motion of steering arm 37 is imparted to connecting rod 39, the latter being pivotally attached to the end of the steering arm 37 remote from the vertical axis 35. Referring to FIGURE 4, it may be seen that the arm 43 pivots relative to the arm 15 about a pin 46 that defines a vertical axis.

Referring now to FIGURES 5–8, a more detailed description may be given of the wheel rake assembly of the leading raking wheel 20. The leading inclined raking wheel 20, having tines 40 extending therefrom, is secured to hubs 50 and 51. The raking wheel 20 is secured to the hub 50 by welding directly thereto, whereas, straps 54, welded to the hub 51, are used to secure the hub 51 to the wheel 20 by bolting the straps thereto using machine screws 55. The hubs 50 and 51 are slidably mounted over a sheath 58, the latter having a rectangular cross-section thus insuring that the hubs 50 and 51 are "keyed" to prevent relative rotational motion. Although the hubs 50 and 51 are free to slide longitudinally of the sheath 58, a rack 60 is secured to the sheath 58 such as by welding, and engages a removable locking bar 61 secured to the hub 50 by bolts 62. Thus, the hubs 51 and 50 are forced to rotate with the sheath 58 and are prevented from sliding longitudinally of the sheath 58 through the utilization of the locking bar 61. It may also be noted that the locking bar 61 may be removed and repositioned at a different location on the rack 60 thereby providing an adjustment for the position of the inclined raking wheel 20 above ground.

The lower end of the sheath 58 is secured, such as by welding, to a ring gear 73 that meshes with a conventional spur gear 74. The spur gear 74 is secured to an axle 75, and is keyed thereto; the opposite end of the axle 75 is connected directly to a ground-contacting wheel 76 which, in the embodiment chosen for illustration, is a conventional pneumatic tire mounted on an appropriate rim. Rotation imparted to the axle 75 by the ground-contacting wheel 76 is thus transmitted by the spur gear 74 to the ring gear 73 and thus to the inclined raking wheel 20 through the sheath 58.

The shaft 42, extending from the arm 43 is secured at the lower end thereof to the axle 75. Any convenient means may be used to secure the shaft to the axle 75 and permit rotation of the latter. In the embodiment chosen for illustration, a housing 85 is clamped to the lower end of the shaft 42. The housing may include appropriate bearings for the axle 75 and is shaped to permit the shaft 42 to extend from the axle 75 at an angle appropriate to the desired angle of inclination of the inclined raking wheel 20.

A secondary sheath 90 is mounted over the shaft 42 and is free to rotate about the shaft; the secondary sheath 90 is keyed to the sheath 58 in any convenient manner such as by a longitudinal, radially-extending, tongue 91. The two sheaths 58 and 90 are thus capable of axial movement relative to each other but are keyed to prevent any relative rotational motion. Thus, when the sheath 58 is rotated, the sheath 90 rotates about the shaft 42. It will be obvious to those skilled in the art that many different arrangements may be utilized to accomplish the axial mobility and locking arrangement of the sheath and shaft design of the present embodiment; however, the specific embodiment shown in FIGURES 5-8 implements the concept of the present invention.

The sheath 58 may be raised axially of the secondary sheath 90 to disengage the gears 73 and 74 and elevate the inclined raking wheel 20 so that the tines 40 extending therefrom are out of contact with the ground. The elevated position of the sheath 58 may be implemented by a locking arrangement shown most clearly in FIGURE 7. A locking tang 95 is welded to the shaft 42 at a position above the end of the secondary sheath 90. A latch 96 secured to the hub 50 is spring-biased toward the shaft 42 by a coil spring 97. Thus, when the inclined raking wheel 20 is raised sufficiently for the latch 96 to engage the locking tang 95, the wheel is held in the elevated position. Since the wheel is connected to the sheath 58 through the locking bar 61 and the rack 60, the sheath 58, and the gear 73, are also elevated and maintained in the elevated position. The raking wheel is thus held out of contact with the ground and the gears 73 and 74 remain disengaged to permit the rake to be transported without driving the raking wheels and without having the raking wheels contacting the ground surface.

The ground-contacting wheel 76 is supported beneath the inclined raking wheel and is positioned in a vertical plane. The tines 40 of the inclined raking wheel completely shroud the ground-contacting wheel 76 so that no part of the wheel extends out from underneath the raking wheel. The axle 75, upon which the ground-contacting wheel 76 is mounted, together with the shaft 42 secured to the axle 75, are positioned by the arm 43 which is free to rotate about the vertical axis 35. The vertical axis 35, when extended downwardly to the ground, passes in front of the axle 75 in the direction of motion of the rake. It has been found that positioning of the ground-contacting wheel 76 so that the vertical axis 35 is directly in front of the axial center line of the wheel by a distance of eight to ten inches provides excellent performance. It may be seen, with the vertical axis positioned in the manner described, that the ground-contacting wheel 76 acts as a caster that pivots about the axis 35 to thereby enable the rake to be turned in any direction while the wheel 76 follows the direction imparted to the frame 10.

Returning to FIGURE 1, the leading inclined raking wheel 20, as described, is identical to the trailing inclined raking wheel 21. The trailing inclined raking wheel 21 pivots about the axis 36 and is supported by a shaft and axle assembly identical to that described in connection with the raking wheel 20. The intermediate raking wheels 22 and 23 are also supported and driven by mechanisms identical to that described in connection with the inclined raking wheel 20; however, the arms 16 and 17 supporting the intermediate raking wheels are pivoted about a horizontal axis as described previously. Thus, the ground-contacting wheels associated with the raking wheels 20 and 21 act as casters and follow the direction imparted thereto by the frame 10; whereas, the driving wheels associated with the intermediate raking wheels are maintained at the same relative angle to the frame 10.

The operation of the present invention may be described as follows. The frame 10 is attached to an appropriate tractive vehicle and drawn through the field containing cut hay. As the hay rake is drawn, in the direction shown in FIGURE 1 by the arrow 100, the respective ground-contacting wheels are rotated. The rotational motion, or torque, developed by each ground-contacting wheel is transmitted through the corresponding axle, through the gear train to the associated sheath and ultimately to the corresponding inclined raking wheel. The raking wheels are thus each rotated in the direction indicated in FIGURE 1 by the arrows 101. The hay is thus transferred from a path in front of the leading inclined raking wheel to each subsequent inclined raking wheel until the trailing raking wheel rakes the hay into a windrow to one side of the hay rake. As the rake is being drawn over the field, the frame 10 is supported above ground by the ground-contacting wheels associated with the leading and trailing raking wheels. These same ground-contacting wheels also permit the rake to be turned around corners at the end of the hay field. It may be noted that when arm 11 is pulled to the left or right by the tractive vehicle attached thereto, the rake pivots about a point located approximately between the intermediate inclined raking wheels. Thus, the ground-contacting wheels associated with the leading and trailing inclined raking wheels will turn about their respective vertical axes in opposite directions. To stabilize the cornering motion, steering arms 37 and 38 are provided, each rotating about the corresponding vertical axis in unison with the associated ground-contacting wheel. The connecting rod insures co-ordination between the ground-contacting wheels and renders cornering operations considerably smoother. The intermediate raking wheels are supported by arms 16 and 17 that are free to pivot about their corresponding horizontal axes to thereby permit the intermediate raking wheels to lower or raise and thus follow the contour of the ground. Each of the ground-contacting wheels aid the raking wheel to elevate out of ruts or other surface irregularities in the hay field. The individual raking wheels may be adjusted to a height above ground corresponding to the conditions necessary for proper operation by removing the locking bar 61 and moving the hubs 50 and 51 axially of the sheath 58. When the desired elevation of the inclined raking wheel is obtained, the locking bar is thus replaced in an appropriate notch in the rack 60.

When the rake is to be transported and not used for raking, such as when the rake is being drawn over hard-surface roads, the sheath 58, and the raking wheels, are elevated to permit the latch 96 to engage the locking tang 95 to thereby lift the corresponding raking wheels out of contact with the ground and, at the same time, disengage the torque-transmitting, or drive, train between the axles and sheaths.

The structure of the present invention provides a convenient means for driving the individual raking wheels while supporting the raking wheels at an appropriate level to enhance the raking action and still permit the rake to be drawn over highways without damage to the road or the rake. Further, the rake of the present invention provides unusual maneuverability at the end of the hay field by enabling the rake to be turned with the assistance of the leading and trailing ground-contacting wheels acting as co-ordinated casters. The rake thus turns considerably easier than prior art rakes without damage to the rake and with consumate ease. The connecting rod and steering arms provided in the rake of the present invention also substantially eliminate oscillation of the leading and trailing ground-contacting wheels. It is well known that casters tend to oscillate about their vertical axes when rolling over a a surface. The oscillations may be caused by any of several factors including dimensional irregularities, or irregularities in the surface upon which the caster travels. Since hay rakes travel over rough ground, oscillation in caster-mounted wheels may become bothersome. The arrangement of the rake of the present invention eliminates such difficulties. The pivotal mounting about horizontal axes of the intermediate raking wheels permits each of the wheels of the hay rake to individually follow the contour of the field while nevertheless eliminating the necessity of supporting wheels common among rakes of the prior art. The raking wheels mounted from the frame 10 and pivoal about a vertical axis may be positioned differently than that shown in FIGURE 1, and it may be found more convenient to place, for example, the pivoting raking wheels (pivotal about a vertical axis) in the first and second positions, and the raking wheels pivotal about a horizontal axis in the third and fourth positions. Further, under certain circumstances, it may be advantageous to place one of the intermediate inclined raking wheels in a leading position on the rake frame. It will therefore be obvious to those skilled in the art that the present invention has been described in terms of a specific embodiment including a specific arrangement and details; therefore, it will be just as obvious to those skilled in the art that many modifications may be made in these details without departing from the spirit and scope of the present invention.

I claim:
1. In a side delivery wheel rake of the type having inclined raking wheels, the improvement comprising:
  (a) a plurality of shafts each for rotatably supporting one of said inclined raking wheels,
  (b) a plurality of axles, each secured to a different one of said shafts beneath the corresponding inclined raking wheel,
  (c) a plurality of ground-contacting wheels each secured to a different one of said axles and positioned beneath the corresponding inclined raking wheel, each of said ground-contacting wheels oriented in a substantially vertical plane,
  (d) a plurality of drive means, each for transmitting torque from a different one of said ground-contacting wheels to a corresponding raking wheel, and
  (e) locking means for locking said drive means in a nondriving position to enable said ground-contacting wheels to rotate without driving said raking wheels.

2. In a side delivery wheel rake of the type having inclined raking wheels, the improvement comprising:
  (a) a plurality of shafts each for rotatably supporting one of said inclined raking wheels,
  (a) a plurality of axles, each secured to a different one of said shafts beneath the corresponding inclined raking wheel,
  (c) a plurality of ground-contacting wheels each secured to a different one of said axles and positioned beneath the corresponding inclined raking wheel, each of said ground-contacting wheels oriented in a substantially vertical plane,
  (d) a plurality of drive means, each for transmitting torque from a different one of said ground-contacting wheels to a corresponding raking wheel,
  (e) locking means for locking said drive means in a non-driving position to enable said ground-contacting wheels to rotate without driving said raking wheels, and
  (f) said locking means including a plurality of latches, one for each raking wheel, for maintaining disengagement of said drive means while supporting said raking wheel out of contact with the ground.

3. An inclined wheel rake comprising:
  (a) a frame adapted to be connected to a tractive vehicle,
  (b) a plurality of inclined raking wheels including a leading raking wheel, a trailing raking wheel, and an intermediate raking wheel,
  (c) a plurality of shafts each for rotatably supporting one of said inclined raking wheels,
  (d) a plurality of axles, each secured to a different one of said shafts beneath the corresponding inclined raking wheel,
  (e) a plurality of ground-contacting wheels each secured to a different one of said axles and positioned beneath the corresponding inclined raking wheel, each of said ground-contacting wheels oriented in a substantially vertical plane,
  (f) a plurality of drive means, each for transmitting torque from a different one of said ground-contacting wheels to a corresponding raking wheel, and
  (g) said intermediate inclined raking wheel rotatably supported on one of said shafts, said one of said shafts pivotally attached to said frame about a horizontal axis.

4. An inclined wheel rake comprising:
  (a) a frame adapted to be connected to a tractive vehicle,
  (b) a plurality of inclined raking wheels including a leading raking wheel, a trailing raking wheel, and an intermediate raking wheel,
  (c) a plurality of shafts each for rotatably supporting one of said inclined raking wheels,
  (d) a plurality of axles, each secured to a different one of said shafts beneath the corresponding inclined raking wheel,
  (e) a plurality of ground-contacting wheels each secured to a different one of said axles and positioned beneath the corresponding inclined raking wheel, each of said ground-contacting wheels oriented in a substantially vertical plane,
  (f) a plurality of drive means, each for transmitting torque from a different one of said ground-contacting wheels to a corresponding raking wheel,
  (g) said intermediate inclined raking wheel rotatably supported on one of said shafts pivotally attached to said frame about a horizontal axis, and
  (h) said leading and trailing raking wheels each rotatably supported on a different one of said shafts, said different ones of said shafts pivotally attached to said frame about a vertical axle.

5. An inclined wheel rake comprising:
  (a) a frame adapted to be connected to a tractive vehicle,
  (b) a plurality of inclined raking wheels including a leading raking wheel, a trailing raking wheel, and an intermediate raking wheel,
  (c) a plurality of shafts each for rotatably supporting one of said inclined raking wheels,
  (d) a plurality of axles, each secured to a different one of said shafts beneath the corresponding inclined raking wheel,
  (e) a plurality of ground-contacting wheels each secured to a different one of said axles and positioned beneath the corresponding inclined raking wheel, each of said ground-contacting wheels oriented in a substantially vertical plane,
  (f) a plurality of drive means, each for transmitting torque from a different one of said ground-contacting wheels to a corresponding raking wheel,
  (g) locking means for locking said drive means in a non-driving position to enable said ground-contacting wheels to rotate without driving said raking wheels, (h) said intermediate inclined raking wheel rotatably supported on one of said shafts pivotally attached to said frame about a horizontal axis, and (i) said leading and trailing raking wheels each rotatably supported on a different one of said shafts, said different ones of said shafts pivotally attached to said frame about a vertical axis.

6. An inclined wheel rake comprising:
(a) a frame adapted to be connected to a tractive vehicle,
(b) a plurality of inclined raking wheels including a leading raking wheel, a trailing raking wheel, and an intermediate raking wheel,
(c) a plurality of shafts each for rotatably supporting one of said inclined raking wheels,
(d) a plurality of axles, each secured to a different one of said shafts beneath the corresponding inclined raking wheel,
(e) a plurality of ground-contacting wheels each secured to a different one of said axles and positioned beneath the corresponding inclined raking wheel, for driving said axles, each of said ground-contacting wheels oriented in a substantially vertical plane and offset from the center of the corresponding raking wheel in a direction transverse to the direction of normal rake travel,
(f) a plurality of first gear means, each connected to a different one of said axles for rotation therewith,
(g) a plurality of second gear means, each connected to a different one of said inclined raking wheels, and each meshing with a corresponding one of said first gear means for transmitting torque from said ground-contacting wheels to said raking wheels,
(h) locking means for locking said first and second gear means in a non-driving position to enable said ground-contacting wheels to rotate without driving said raking wheels,
(i) said locking means including a plurality of latches, one for each raking wheel, for maintaining disengagement of said first and second gear means while supporting said raking wheel out of contact with the ground,
(j) said intermediate inclined raking wheel rotatably supported on one of said shafts pivotally attached to said frame about a horizontal axis, and
(k) said leading and trailing raking wheels each rotatably supported on a different one of said shafts, said different ones of said shafts pivotally attached to same frame about a vertical axis.

7. An inclined wheel rake comprising:
(a) a frame adapted to be connected to a tractive vehicle,
(b) a plurality of inclined raking wheels,
(c) a plurality of shafts each for rotatably supporting one of said inclined raking wheels,
(d) a plurality of axles, each secured to a different one of said shafts beneath the corresponding inclined raking wheel,
(e) a plurality of ground-contacting wheels each secured to a different one of said axles and positioned beneath the corresponding inclined raking wheel, each of said ground-contacting wheels oriented in a substantially vertical plane,
(f) a plurality of drive means, each for transmitting torque from a different one of said ground-contacting wheels to a corresponding raking wheel,
(g) at least one of said shafts pivotally attached to said frame about a horizontal axis, and
(h) at least one of said shafts pivotally attached to said frame about a vertical axis.

8. An inclined wheel rake comprising:
(a) a frame adapted to be connected to a tractive vehicle,
(b) a plurality of inclined raking wheels,
(c) a plurality of shafts each for rotatably supporting one of said inclined raking wheels,
(d) a plurality of axles, each secured to a different one of said shafts beneath the corresponding inclined raking wheel,
(e) a plurality of ground-contacting wheels each secured to a different one of said axles and positioned beneath the corresponding inclined raking wheel, each of said ground-contacting wheels oriented in a substantially vertical plane,
(f) a plurality of drive means, each for transmitting torque from a different one of said ground-contacting wheels to a corresponding raking wheel,
(g) locking means for locking said drive means in a nondriving position to enable said ground-contacting wheels to rotate without driving said raking wheels,
(h) at least one of said shafts pivotally attached to said frame about a horizontal axis, and
(i) at least one of said shafts pivotally attached to said frame about a vertical axis.

9. An inclined wheel rake comprising:
(a) a frame adapted to be connected to a tractive vehicle,
(b) a plurality of inclined raking wheels including a leading raking wheel, a trailing raking wheel, and an intermediate raking wheel,
(c) a plurality of shafts each for rotatably supporting one of said inclined raking wheels,
(d) a plurality of axles, each secured to a different one of said shafts beneath the corresponding inclined raking wheel,
(e) a plurality of ground-contacting wheels each secured to a different one of said axles and positioned beneath the corresponding inclined raking wheel, each of said ground-contacting wheels oriented in a substantially vertical plane,
(f) a plurality of drive means, each for transmitting torque from a different one of said ground-contacting wheels to a corresponding raking wheel,
(g) said intermediate inclined raking wheel rotatably supported on one of said shafts pivotally attached to said frame about a horizontal axis,
(h) said leading and trailing raking wheels each rotatably supported on a different one of said shafts, said different ones of said shafts pivotally attached to said frame about a vertical axis, and
(i) the shafts of said leading and trailing raking wheels pivotally attached to opposite ends of a connecting rod to insure said shafts rotate in opposite directions about their respective vertical axes.

10. A wheel rake comprising:
(a) a frame adapted to be connected to a tractive vehicle,
(b) a plurality of raking wheels including a leading raking wheel, a trailing raking wheel, and an intermediate raking wheel,
(c) a plurality of shafts each for rotatably supporting one of said raking wheels,
(d) a plurality of axles, each secured to a different one of said shafts,
(e) a plurality of ground-contacting wheels each secured to a different one of said axles, each of said ground-contacting wheels oriented in a substantially vertical plane,
(f) a plurality of drive means, each for transmitting torque from a different one of said ground-contacting wheels to a corresponding raking wheel,
(g) said intermediate raking wheel rotatably supported on one of said shafts, said one of said shafts pivotally attached to said frame about a horizontal axis, and
(h) said leading and trailing raking wheels each rotatably supported on a different one of said shafts, said different ones of said shafts pivotally attached to said frame about a vertical axis.

11. An inclined wheel rake comprising:
(a) a frame adapted to be connected to a tractive vehicle,
(b) a plurality of inclined raking wheels including a leading raking wheel, a trailing raking wheel, and an intermediate raking wheel,
(c) a plurality of shafts each for rotatably supporting one of said inclined raking wheels,
(d) a plurality of axles, each secured to a different one of said shafts beneath the corresponding inclined raking wheel,
(e) a plurality of ground-contacting wheels each secured to a different one of said axles and positioned beneath the corresponding inclined raking wheel, each of said ground-contacting wheels oriented in a substantially vertical plane,
(f) a plurality of drive means, each for transmitting torque from a different one of said ground-contacting wheels to a corresponding raking wheel, and
(g) at least one of said leading and trailing raking wheels rotatably supported on a different one of said shafts, said different one of said shafts pivotally attached to said frame about a vertical axis.

References Cited

FOREIGN PATENTS

| | | |
|---|---|---|
| Ad. 80,922 | 5/1963 | France. |
| 1,337,158 | 7/1963 | France. |
| 1,352,702 | 1/1964 | France. |
| 1,352,741 | 1/1964 | France. |
| 1,361,205 | 4/1964 | France. |
| 911,872 | 11/1962 | Great Britain. |

ABRAHAM G. STONE, *Primary Examiner.*

RUSSELL R. KINSEY, *Examiner.*